US008337986B2

(12) United States Patent

Moorlag et al.

(10) Patent No.: US 8,337,986 B2
(45) Date of Patent: *Dec. 25, 2012

(54) FUSER MEMBER COATING HAVING ALIPHATIC-AROMATIC FLUOROPOLYMERS

(75) Inventors: Carolyn Moorlag, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 836 days.

This patent is subject to a terminal disclaimer.

(21) Appl. No.: 12/181,388

(22) Filed: Jul. 29, 2008

(65) Prior Publication Data

US 2010/0028797 A1 Feb. 4, 2010

(51) Int. Cl.

| | |
|---|---|
| ***B32B 27/26*** | (2006.01) |
| ***B32B 27/28*** | (2006.01) |
| ***G03G 15/20*** | (2006.01) |

(52) U.S. Cl. ........................ 428/421; 428/422; 399/333

(58) Field of Classification Search ........................ None
See application file for complete search history.

(56) References Cited

U.S. PATENT DOCUMENTS

| | | | | |
|---|---|---|---|---|
| 4,257,699 | A * | 3/1981 | Lentz | 430/124.33 |
| 6,313,185 | B1 | 11/2001 | Lau et al. | |
| 7,127,205 | B2 | 10/2006 | Gervasi et al. | |
| 2005/0245693 | A1 | 11/2005 | Bhatt | |
| 2005/0288483 | A1 | 12/2005 | Ding et al. | |
| 2006/0135716 | A1 * | 6/2006 | Hung et al. | 526/247 |

OTHER PUBLICATIONS

Shi, Zhi Qing, "Systhesis and Characterization of Proton Conducting, Fluorine-Containing Block Copolymers," Thesis Submitted in Partial Fulfillment of the Requirements for the Degree of Doctor of Philosophy, Simon Fraser University, 2004, pp. 116-121.

DuPont; Bisphenol AF, Technical Information, Oct. 26, 2006, pp. 1-3.

Ding, Jianfu et al., "Highly Fluorinated Poly(arylene alkylene ether sulfone)s: Synthesis and Thermal Properties," Macromolecules, 2007, 40, pp. 3145-3153.

* cited by examiner

*Primary Examiner* — Ramsey Zacharia

(74) *Attorney, Agent, or Firm* — MH2 Technology Law Group

(57) ABSTRACT

A fuser member including a substrate, and thereover, an outer layer with a fluorinated polymer having a flexible aliphatic segment and a rigid aromatic segment, wherein the aliphatic segment and the aromatic segment are bonded through a linkage group.

19 Claims, 2 Drawing Sheets

FUSER MEMBER COATING HAVING ALIPHATIC-AROMATIC FLUOROPOLYMERS

CROSS REFERENCE TO RELATED APPLICATIONS

Attention is directed to U.S. Pat. No. 7,935,768 filed Jul. 29, 2008, entitled "Coating Compositions Having Crosslinked Fluoroaromatic Polymers," the subject matter of which is hereby incorporated by reference in its entirety.

BACKGROUND

The disclosed embodiments generally relate to the field of fluoropolymers, and to the preparation and use of aliphatic-aromatic fluoropolymers. Aliphatic-aromatic fluoropolymers may be crosslinked to give an elastomeric material that may be useful for applying a top layer coating onto a fuser roll or belt used in printing and copying operations.

In a typical electrostatographic printing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be a photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher depending upon the softening range of the particular resin used in the toner. It is not desirable, however, to raise the temperature of the substrate substantially higher than about 200° C. because of the tendency of the substrate to discolor at such elevated temperatures, particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation to the hot offset temperature is a measure of the release property of the fuser roll, and accordingly it is desired to provide a fusing surface, which has a low surfaced energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

One of the earliest and successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks, which is incorporated herein in its entirety.

While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly of a fuser roll at elevated temperatures.

Fuser and fixing rolls or belts may be prepared by applying one or more layers to a suitable substrate. Cylindrical fuser and fixer rolls, for example, may be prepared by applying an elastomer or fluoroelastomer to an aluminum cylinder. The coated roll is heated to cure the elastomer. Such processing is disclosed, for example, in U.S. Pat. Nos. 5,501,881; 5,512,409; and 5,729,813; the disclosure of each of which is incorporated by reference herein in their entirety.

U.S. Pat. No. 7,127,205, which is hereby incorporated by reference in its entirety, provides a process for providing an elastomer surface on a fusing system member. Generally, the process includes forming a solvent solution/dispersion by mixing a fluoroelastomer dissolved in a solvent such as methyl ethyl ketone and methyl isobutyl ketone, a dehydrofluorinating agent such as a base, for example the basic metal oxides, MgO and/or $Ca(OH)_2$, and a nucleophilic curing agent such as VC-50 which incorporates an accelerator and a crosslinking agent, and coating the solvent solution/dispersion onto the substrate. Commonly used fluoropolymer crosslinkers are bisphenol-A and bisphenol AF that are known to react with unsaturated positions on fluoropolymer chains. The surface is then stepwise heat cured. Prior to the stepwise heat curing, ball milling is usually performed for from 2 to 24 hours.

A more mechanically robust coating is required for new generation fusing systems in order to improve lifetime and diminish the occurrence of roll failure due to edge wear. Higher thermal conductivity of the top layer would improve heat retention at the surface during fusing, and electrical conductivity would dissipate any static charge buildup.

Known fuser coatings include crosslinked fluoropolymers such as VITON-GF® (DuPont) used in conjunction with a release fluid, or perfluoroalkoxy polymer resin (PFA) used in oil-free or low oil applications. While these polymers have desirable properties such as thermal and chemical stability, and low surface-energy, fuser rolls continue to fail at shorter times than is desirable, primarily due to wear and poor release at the surface (offset). A new material system for fusing is desired that exhibits improved mechanical properties such as wear, and modified surface interactions to improve release and reduce or eliminate the use of fuser oil. Improving these properties would extend fuser roll or belt life. Aliphatic-aromatic fluoropolymers incorporate the heat resistance and release properties of fluoropolymers, with the high modulus of stiff aromatic ring components and the flexibility of aliphatic chain components, whereby modifying ratios of the two components can be used to tailor properties. The mixed aliphatic-aromatic fluoropolymers contain a crosslinkable component and can be crosslinked using nucleophilic crosslinking agents. This results in elastomeric character of the material, and mechanical robustness.

The disclosure contained herein describes attempts to address one or more of the problems described above.

SUMMARY

Embodiments include, a fuser member comprising a substrate, and thereover, an outer layer comprising a fluorinated polymer comprising a flexible aliphatic segment and a rigid aromatic segment, wherein the flexible aliphatic segment and the rigid aromatic segment are bonded through a linkage group.

Embodiments also include a fuser member comprising a substrate, and thereover, an outer layer comprising a fluorinated aromatic-aliphatic polyether comprising a polymer selected from the group consisting of the following:

wherein $C_nF_{2n}$ and $C_mF_{2m}$ are each a linear or branched perfluorocarbon chain, n is a number of from about 1 to about 100, m is a number of from about 1 to about 6, x is a number of from about 1 to about 500, and a, b, and c are molar ratios wherein a is a number of from about 0.25 to about 0.75, b is a number of from about 0.25 to about 0.75, c is a number of from about 0.01 to about 0.25, and a+b+c=1.

In addition, embodiments include an image forming apparatus for forming images on a recording medium comprising a charge-retentive surface to receive an electrostatic latent image thereon; a development component to apply toner to the charge-retentive surface to develop an electrostatic latent image to form a developed image on the charge retentive surface; a transfer component to transfer the developed image from the charge-retentive surface to a copy substrate; and a fuser member for fusing toner images to a surface of the copy substrate, wherein said fuser member comprises a substrate, and thereover, an outer layer comprising a crosslinked fluorinated aromatic-aliphatic polyether.

BRIEF DESCRIPTION OF THE DRAWINGS

The above embodiments will become apparent as the following description proceeds upon reference to the drawings, which include the following figures.

DETAILED DESCRIPTION

Embodiments herein describe a fuser member coating comprising aliphatic-aromatic fluoropolymers, where monomeric repeat units are selected from the group consisting of fluorinated flexible segments and fluorinated rigid segments. The monomeric repeat units are covalently bonded together. Also embodied herein are crosslinked fluoroelastomers resulting from the addition of crosslinking agents that become bonded to fluoropolymer chains. A networked system results from thermal curing of aliphatic-aromatic fluoropolymer materials mixed with crosslinking agents and other chemical components that enable crosslinking. It is expected that fluoropolymer properties are tunable by varied levels of incorporation of fluorinated flexible and fluorinated

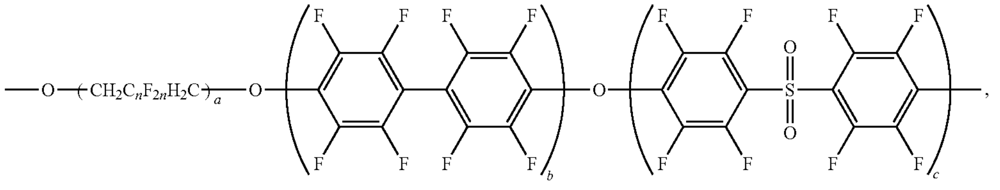

, and

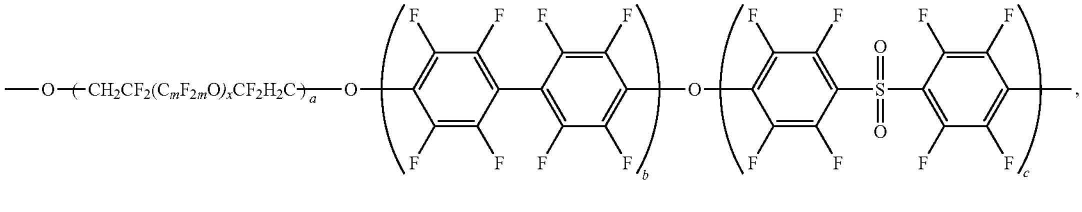

, rigid segments. By tuning the properties, it is expected that aliphatic-aromatic fluoropolymers would display desirable mechanical properties and release in fusing.

Figure 1:
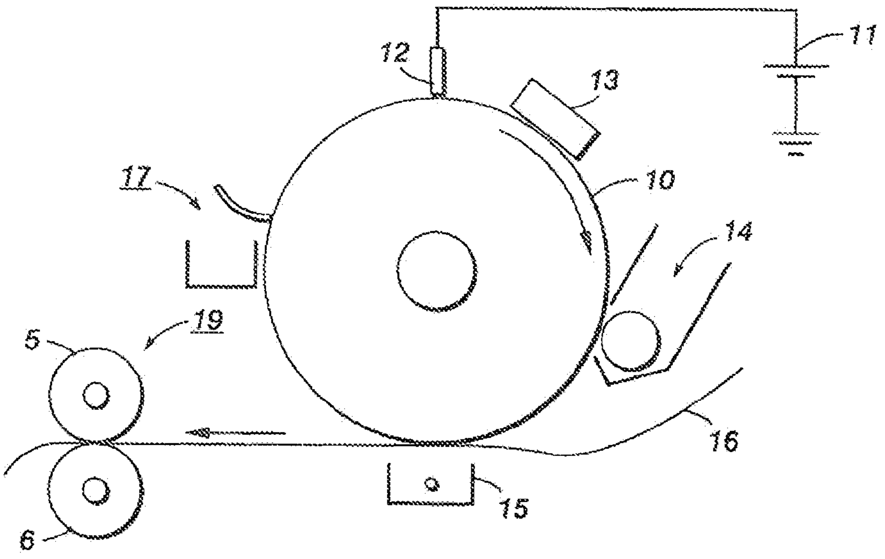
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 5 and pressure member 6, thereby forming a permanent image. Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
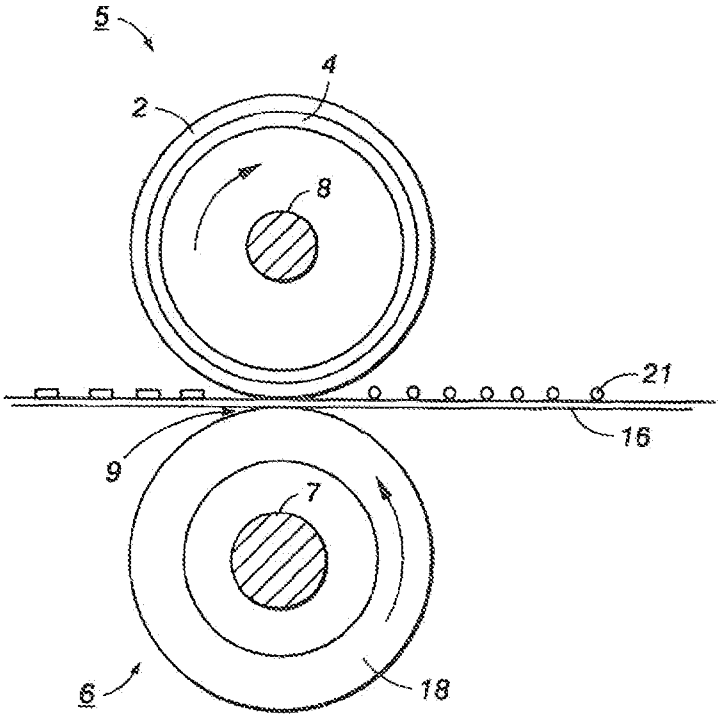
FIG. 2 is a sectional view of a fusing assembly in accordance with one embodiment disclosed herein.

In FIG. 2, fuser roller 5 can be a hollow cylinder or core fabricated from any suitable metal, such as aluminum, anodized aluminum, steel, nickel, copper, and the like, having a suitable heating element 8 disposed in the hollow portion thereof which is coextensive with the cylinder.

Backup or pressure roll 6 cooperates with fuser roll 5 to form a nip or contact arc 9 through which a copy paper or other substrate 16 passes such that toner images 21 thereon contact surface 2 of fuser roll 5. As shown in FIG. 2, the backup roll 6 has a rigid steel core 7 with a surface or layer 18 thereon.

In embodiments, the fuser system is oil-less and there is no release agent needed for fusing. No oil is applied to the fuser roller, and the release agent delivery rollers are not present in the system. However, in other embodiments, the system could possibly use a release agent.

The fusing component can be comprised of at least three different configurations. In one embodiment, the fusing component is of a two-layer configuration as shown in FIG. 2. Fuser member 5 having heating element 8, comprises substrate 4. Positioned over the substrate 4 is outer layer 2.

Figure 3:
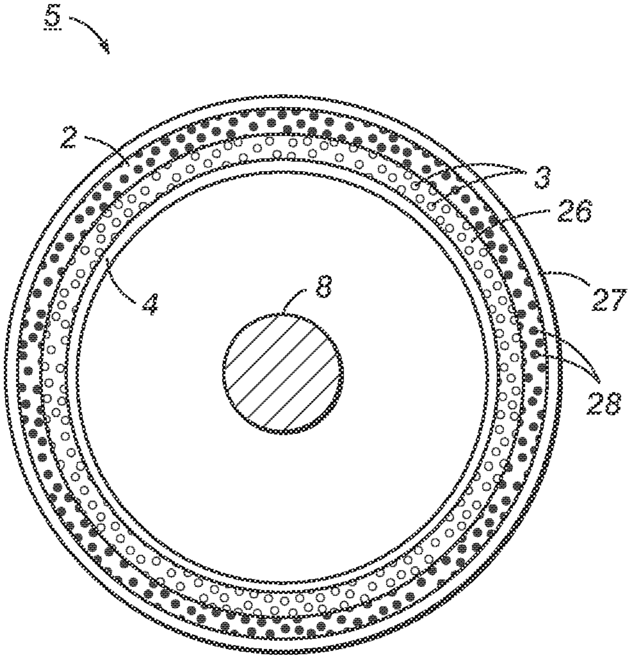
FIG. 3 is a sectional view of a fuser roller having a three-layer configuration.
Figure 4:
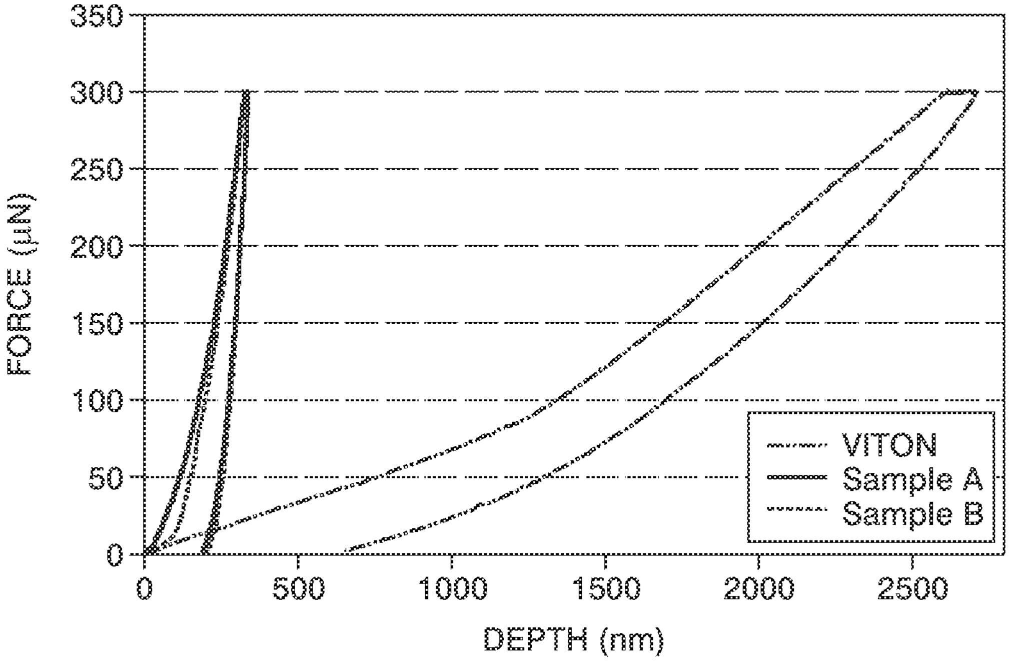
FIG. 4 is a graph of depth versus force for a fluoroelastomer (VITON®) and Samples A and B.

FIG. 3 demonstrates a three-layer configuration, wherein fuser roller 5 has heating member 8 inside, and thereover substrate 4 and having intermediate layer 26 positioned on substrate 4, and outer layer 2 positioned on intermediate layer 26. FIG. 3 demonstrates optional fillers 3 and 28, which may be the same or different, and can be dispersed optionally in the intermediate layer 26, and/or optionally in the outer layer 2. There may be provided none, one, or more than one type of filler(s) in the layer(s).

In embodiments, there may be present an outer release layer 27 positioned on the outer layer 2 as shown in FIG. 3. However, in embodiments, there is no outer release layer.

Examples of suitable substrate materials include, in the case of roller substrate, metals such as aluminum, stainless steel, steel, nickel and the like. In the case of film-type substrates (in the event the substrate is a fuser belt, film, drelt (a cross between a drum and a belt) or the like) suitable substrates include high temperature plastics that are suitable for allowing a high operating temperature (i.e., greater than about 80° C., or greater than 200° C.), and capable of exhibiting high mechanical strength.

In embodiments, the fluoropolymers herein comprise a flexible segment comprising linear or branched aliphatic or polyether-based chain components that are partially or entirely fluorinated and a rigid segment comprising aromatic components that are partially or entirely fluorinated. The components described herein are connected via a covalent bond, such as an ether linkage.

The term "rigid" refers to a molecular segment imparting stiffness or mechanical strength to the resulting fluoropolymer material.

In embodiments, the flexible aliphatic segment and rigid aromatic segment are bonded through a linkage group selected from the group consisting of an ether, a thioether, and an ester.

In embodiments, flexible repeat monomers are linear or branched aliphatic- or polyether-based chain components that are partially or entirely fluorinated and the hydrocarbon component has a carbon number from about 1 to about 500, or from about 10 to about 200, or from about 25 to about 75. Molecular weights include the oligomeric to polymeric range of from about 100 to about 15,000, or from about 500 to about 5,000, or from about 1200 to about 2500. Examples include a hydrocarbon component selected from the group consisting of a partially fluorinated hydrocarbon having from about 1 to about 500 carbons, or from about 1 to about 250 carbons, and a perfluorohydrocarbon having from about 1 to about 500 carbons, or from about 1 to about 250 carbons.

The term "flexible" refers to a molecular segment imparting mechanical flexibility to the resulting fluoropolymer material.

By the incorporation of a balance of aliphatic flexible and aromatic rigid molecular segments into fluoropolymer chains, the desired amount of mechanical flexibility and mechanical stiffness can be achieved.

In embodiments, an aliphatic-aromatic fluoropolymer comprises the following Formula I:

$$-(A)_y-L-(B)_z-L- \qquad \text{Formula I}$$

wherein A represents a flexible repeat monomer, B represents a rigid repeat monomer, and L represents a linker group between said flexible and rigid components, subscripts y and z refer to the ratios of the molecular segments along the polymer chains wherein y+z=1, and y is a number of 0 or 1 and z is a number of 0 or 1.

Illustrative examples of flexible component "A" comprising aliphatic fluorocarbon segments in Formula I above, include $-(C_nF_{2n})-$, $-CH_2(C_nF_{2n})CH_2-$, and $-CH_2CH_2(C_nF_{2n})CH_2CH_2-$, and mixtures thereof, wherein $C_nF_{2n}$ is a linear or branched perfluorocarbon chain and n is a number of from about 1 to about 300, or from about 1 to about 100, or from about 1 to about 50.

Illustrative examples of flexible component "A" comprising perfluoroether segments in Formula I above, include $—(C_nF_{2n}O)_x—$, $—CH_2CF_2O(C_nF_{2n}O)_xCF_2CH_2—$, $—CH_2CH_2OCH_2CF_2O(C_nF_{2n}O)_xCF_2CH_2OCH_2CH_2—$, and mixtures thereof, or copolymers thereo wherein $C_nF_{2n}$ is a linear or branched perfluorocarbon chain, n is a number of from about 1 to about 6, or from about 1 to about 5, and x is a number of from about 1 to about 500, or from about 1 to about 300.

In embodiments, the flexible aliphatic segment comprises a perfluoropolyether component selected from the group consisting of poly(difluoromethylene oxide), poly(tetrafluoroethylene oxide), poly(hexafluoropropylene oxide), poly(tetrafluoroethylene oxide-co-difluoromethylene oxide), poly (hexafluoropropylene oxide-co-difluoromethylene oxide), and poly(tetrafluoroethylene oxide-co-hexafluoropropylene oxide-co-difluoromethylene oxide).

In embodiments, the flexible aliphatic segment comprises $—(C_nF_{2n}O)_x—$, or a copolymer comprised thereof, wherein n is an integer of from 1 to about 6, or from about 1 to about 5, and x is the number of repeating units ranging from about 2 to about 500, or from about 2 to about 250.

In embodiments, the fluoroether component is random or block copolymer selected from the group consisting of:

-continued

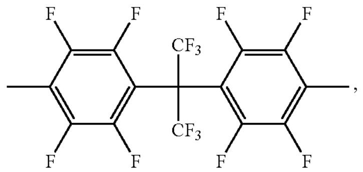,

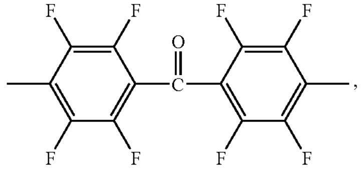,

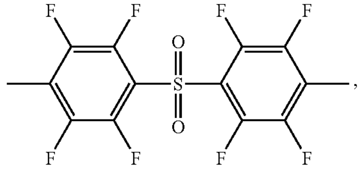,

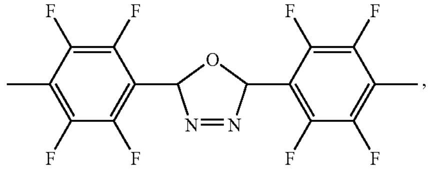,

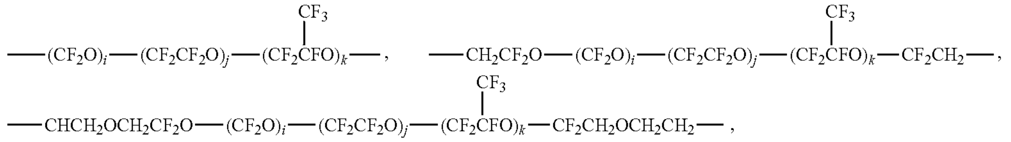

and mixtures thereof, wherein i, j, and k each represent an integer ranging from 0 to about 200, of from about 1 to about 100, and wherein the total of i+j+k is ranging from about 3 to about 600, or from about 5 to about 250.

The flexible aliphatic segment may comprise a monomeric repeat unit selected from the group consisting of vinylidene fluoride, tetrafluoroethylene, hexafluoropropylene, perfluoro (methyl vinyl ether), perfluoro(ethyl vinyl ether), perfluoro (propyl vinyl ether), and mixtures thereof.

In embodiments, an aliphatic-aromatic fluoropolymer may comprise more than one type of flexible repeat monomer.

In embodiments, rigid aromatic segment "B" in Formula I above are linear or branched aromatic carbon chains that are partially or entirely fluorinated and have a carbon number of from about 6 to about 60, or from about 12 to about 24.

Illustrative examples of linear aromatic fluorocarbon rigid component "B" in Formula I above include the following structures:

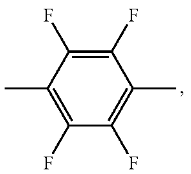, 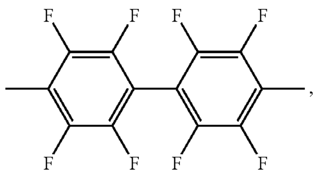,

-continued

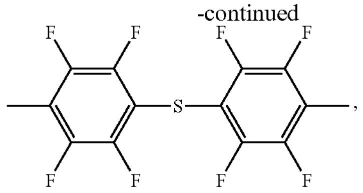,

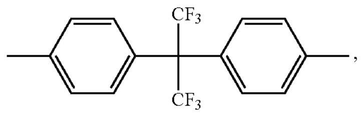, and mixtures thereof.

In embodiments, an aliphatic-aromatic fluoropolymer may comprise more than one type of rigid repeat monomer "B."

In embodiments, linker groups "L" in Formula I above are molecular segments that join together the flexible repeat monomers and rigid repeat monomers. In embodiments, linker groups may be ether, thioether, ester, sulfide, other linkages or other chemical groups. Examples are illustrated below:

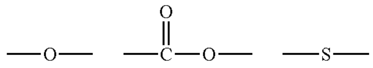

In embodiments, aliphatic-aromatic fluoropolymers are prepared by any polymerization method capable of polymerizing fluorinated flexible repeat monomers and fluorinated rigid repeat monomers. In a method embodiment, polymerization is carried out by stepwise reaction of functional groups attached to the terminating end of the repeat monomers. In embodiments, polymerization occurs by condensation reactions between functional groups. Examples of such condensation reactions include reaction of alcohols, or reaction of alcohols and alkenes, in the presence of acid catalyst to form polyethers. In further embodiments, polymerization occurs by condensation of amines and carboxylic acids to form polyamides, or polymerization occurs by condensation of alcohols and carboxylic acids to form polyesters. In other embodiments, polymerization occur by other stepwise reactions through terminal functional groups of repeat monomers.

In embodiments, a fuser member coating comprising aliphatic-aromatic fluoropolymers is crosslinked by the addition of nucleophilic crosslinking agents.

In embodiments, suitable crosslinking agents include a biphenol such as hydroquinone, a bisphenol such as bisphenol A (2,2-bis(4-hydroxyphenyl)propane) or bisphenol AF (2,2-bis(4-hydroxyphenyl)hexafluoropropane, in commercial formulations such as VC50 from Dupont), an aminosilane such as AO700 (aminoethyl aminopropyl trimethoxysilane crosslinker from Gelest), a diamine such as hexamethylenediamine, and a masked diamine such as N,N'-dicinnamylidene-1,6-hexanediamine. A "masked" diamine refers to the coordination of functional groups to amine functionalities. In embodiments, a fluoropolymer is dissolved in a solvent and a crosslinking agent is added along with other components that enable crosslinking.

In a method embodiment, a crosslinked aliphatic-aromatic fluoropolymer is prepared by dissolving a plurality of aliphatic-aromatic fluoropolymer in a solvent such as methyl ethyl ketone (MIK), methyl isobutyl ketone (MIBK), or the like solvent. The solids loading can be from about 10 to about 20, or from about 15 to about 18, or about 17.5 percent by weight of total solids. The solution is mixed with surfactants such as Novec® FC-4430 (available from 3M), AKF-290 (available by Wacker), like surfactants, and/or mixtures thereof, followed by addition of basic oxides such as of magnesium oxide (for example, ElastoMag 170 Special available from Rohm and Hass, Andover, Mass.) and calcium hydroxide. To this mixture is added a crosslinker such as bisphenol AF crosslinker (for example, VC50 from Dupont).

In other method embodiments, the basic metal oxide particles may be selected from magnesium oxide, calcium oxide, calcium hydroxide, and the like, and mixtures thereof. A filtering step may be used to remove large metal oxide particles before addition to the aliphatic-aromatic fluoropolymer mixture.

In embodiments, an aliphatic-aromatic fluoropolymer suitable for fusing topcoat applications may comprise the following. The flexible aliphatic repeat unit, in embodiments, may be a fluorocarbon $-CH_2(C_nF_{2n})CH_2-$, wherein $C_nF_{2n}$ is a linear or a branched perfluorocarbon chain, and n is a number of from about 2 to about 300. The flexible aliphatic repeat unit, in other embodiments, may be a perfluoroether $-CH_2CF_2O(C_nF_{2n}O)_xCF_2CH_2-$, wherein $C_nF_{2n}$ is a linear or branched perfluorocarbon chain, n is a number of from about 1 to about 6, and x is a number of from about 1 to about 500. The rigid aromatic repeat unit, in embodiments, may be mixtures of octafluorodiphenyl and octafluorodiphenylsulphone. The flexible and rigid repeat monomers, in embodiments, may be linked together with ether linker groups. Examples of the resulting aliphatic-aromatic fluoropolymer chains are represented as Formula II and Formula III:

Formula II

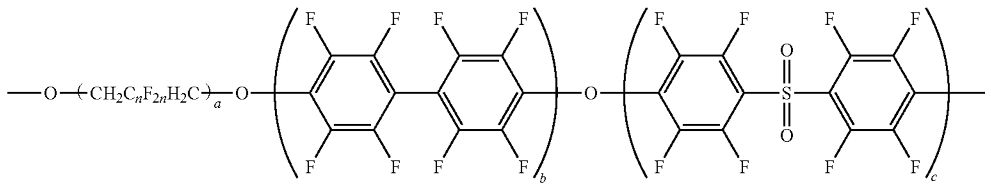

Formula III

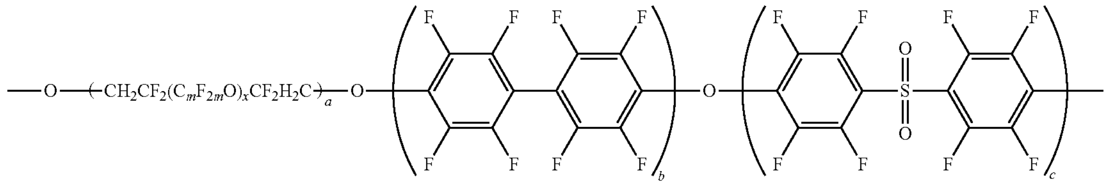

wherein $C_nF_{2n}$ and $C_mF_{2m}$ are each a linear or branched perfluorocarbon chain, n is a number of from about 1 to about 100, or from about 1 to about 50; m is a number of from about 1 to about 6, or from about 1 to about 5; x is a number of from about 1 to about 500, or from about 1 to about 300; and a, b, and c are molar ratios wherein a is a number of from about 0.25 to about 0.75, or from about 0.3 to about 0.7; b is a number of from about 0.25 to about 0.75, or from about 0.3 to about 0.7; and c is a number of from about 0.01 to about 0.25, or from about 0.01 to about 0.2; and a+b+c=1.

In embodiments, aliphatic-aromatic fluoropolymers comprised of Formula II-III are crosslinked, crosslinking is expected to occur via nucleophilic substitution at saturated fluorinated positions of the fluoroaromatic rings, and reactivity to crosslinking is expected to be enhanced by proximity to the sulfone functionalities. The plurality of fluoropolymer chains are crosslinked together by the addition of VC50 crosslinking system, and it is expected that crosslinking would occur along multiple sites of fluoropolymer chains, and for a multitude of chains to yield crosslinked aliphatic-aromatic polymer.

In embodiments, the crosslinked fluorinated aromatic-aliphatic fluoropolymer prepared from Formula II has the following Formula IV:

Formula IV

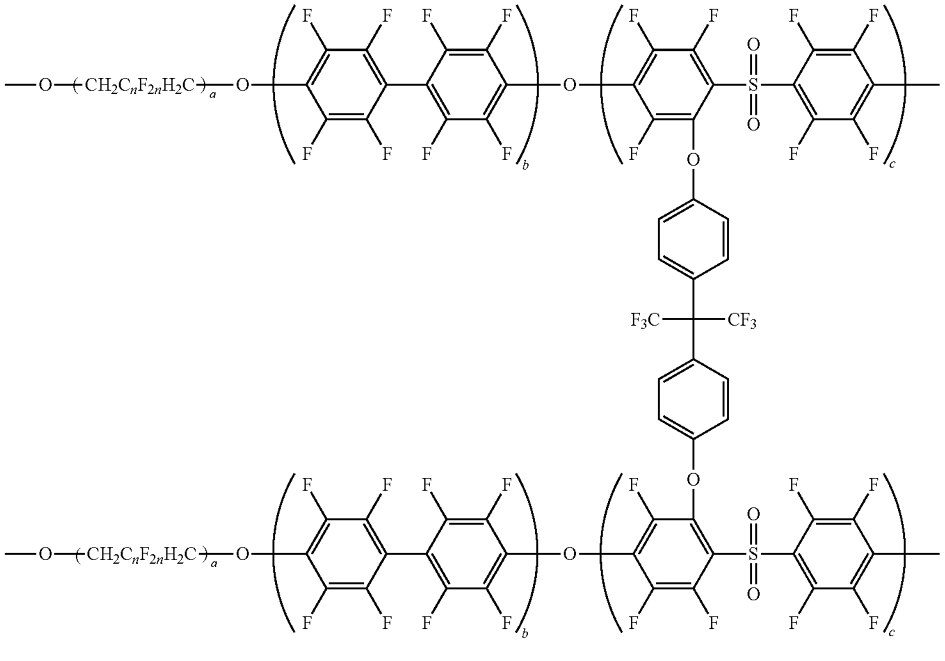

wherein $C_nF_{2n}$ is a linear or branched perfluorocarbon chain, n is a number of from about 1 to about 100, and a, b, and c are molar ratios wherein a is a number of from about 0.25 to about 0.75, b is a number of from about 0.25 to about 0.75, c is a number of from about 0.01 to about 0.25, and a+b+c=1.

In embodiments, the crosslinked fluorinated aromatic-aliphatic fluoropolymer prepared from Formula III has the following Formula V:

wherein $C_mF_{2m}$ is a linear or branched perfluorocarbon chain, m is a number of from about 1 to about 6, x is a number of from about 1 to about 500, and a, b, and c are molar ratios wherein a is a number of from about 0.25 to about 0.75, b is a number of from about 0.25 to about 0.75, c is a number of from about 0.01 to about 0.25, and a+b+c=1.

In embodiments, a method may further include coating the aliphatic-aromatic fluoropolymer onto a substrate. The aliphatic-aromatic fluoropolymer may be cured, and curing may Formula V

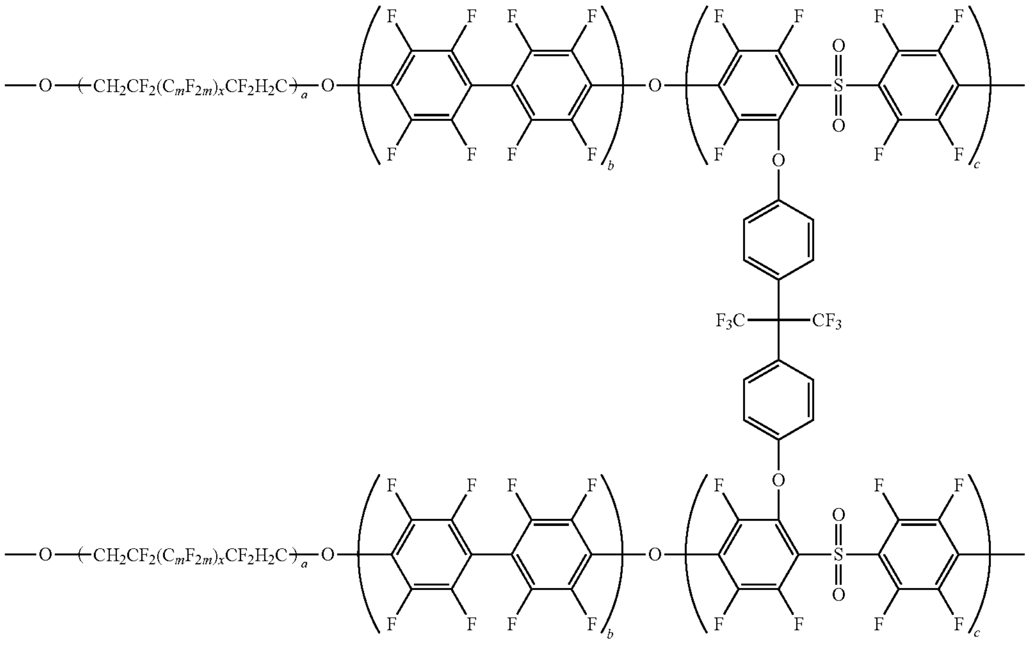

be realized by heating. Examples of curing agents include those selected from the group consisting of diamines, bisphenols, masked diamine, aminosilane, and mixtures thereof. Specific examples include hexamethylenediamine, N,N'-dicinnamylidene-1,6-hexanediamine, [3-(trimethoxysilyl)propyl]-ethylenediamine, hydroquinone, substituted hydroquinones, 2,2-bis(4-hydroxyphenyl)hexafluoropropane (Bisphenol AF), and 2,2-bis(4-hydroxyphenyl)propane (Bisphenol A).

In a method embodiment, the substrate may be selected from the group consisting of a fuser member, polymer substrates such as plastics, silicone polymers and the like, metals, metal oxides, silicone oxides, ceramics and the like.

The outer material composition can be coated on the substrate in any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating, and the like. In an embodiment, the aliphatic-aromatic fluoropolymer material coating is spray or flow coated to the substrate. Details of the flow coating procedure can be found in U.S. Pat. No. 5,945,223, the disclosure of which is hereby incorporated by reference in its entirety.

The outer layer is coated to a thickness of from about 5 to about 100 microns, or from about 20 to about 40 microns, or from about 15 to about 25 microns.

In embodiments, crosslinked aliphatic-aromatic fluoropolymers comprising highly fluorinated flexible and rigid segments that are coated onto fusing members may display improved release during fusing compared with conventionally crosslinked VITON® fluoropolymer. Improved release of toner and paper and other contaminants in contact with a fuser member may be due to a higher degree of fluorination at the fusing surface. Improved release may also occur due to a lower degree of interaction of fluorinated crosslinkable positions of aliphatic-aromatic fluoropolymers compared with protonated carbon crosslinking positions of VITON® fluoroelastomer.

The following Examples further define and describe embodiments herein. Unless otherwise indicated, all parts and percentages are by weight.

EXAMPLES

Example 1

Crosslinking of Aliphatic-Aromatic Fluoropolymer Coatings

It is expected that a fuser member coating formulation could be prepared from a solvent solution/dispersion containing 100 parts by weight of an aliphatic-aromatic fluoropolymer having the following formula:

Formula II

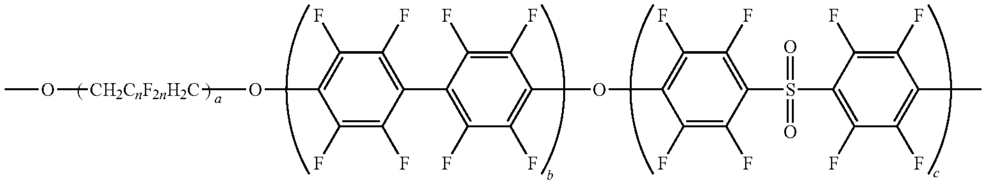

Heating the fluoropolymer coating may be a step curing cycle where the temperature and heating time at temperature are varied; these curing cycles for fluoroelastomers are known by persons of ordinary skill in the art. The outer layer is heat treated by stepwise heat treatment to a temperature of from about 170° C. to about 250° C., or from about 200° C. to about 240° C., or from about 218° C. to about 232° C.

In an embodiment, the outer layer may be modified by any known technique such as sanding, polishing, grinding, blasting, coating, or the like. In embodiments, the outer fluoropolymer layer has a surface roughness of from about 0.02 to about 1.5 micrometers, or from about 0.3 to about 0.8 micrometers.

Embodiments herein could be used in fusing applications as a highly crosslinked fluoropolymer top coating. The extent of crosslinking could be improved compared to conventionally crosslinked VITON® fluoropolymer for aliphatic-aromatic fluoropolymers with a high ratio of crosslinking sites along fluoropolymer chains. In further embodiments, aliphatic-aromatic fluoropolymers comprising a high ratio of flexible aliphatic components that are highly crosslinked would display enhanced elasticity and mechanical properties similar to that of a silicone rubber surface of a fuser roll and the similar match of physical properties may prevent delamination. Increased crosslinking with improved elasticity may additionally decrease roll or belt degradation that occurs due to fatigue occurring during the fusing process.

wherein $C_nF_{2n}$ is a linear or branched perfluorocarbon chain, n is a number of from about 1 to about 100, and a, b, and c are molar ratios wherein a is a number of from about 0.25 to about 0.75, b is a number of from about 0.25 to about 0.75, c is a number of from about 0.01 to about 0.25, and a+b+c=1.

The outer layer may further comprise a metal oxide filler such as alumina, silica, magnesium oxide, calcium hydroxide, titania, copper oxide, and the like; or a carbon filler such as carbon black, fluorinated carbon, graphite, or the like, or mixtures thereof.

The aliphatic-aromatic fluoropolymer would be dissolved in a mixture of methylethylketone and methylisobutyl ketone, and mixed with 7 parts by weight VC50 crosslinker (from DuPont), 1.5 parts by weight magnesium oxide (ElastoMag 170 Special available from Rohm and Hass, Andover, Mass.), 0.75 parts by weight calcium hydroxide, 0.75 parts by weight carbon black (N990 available from R. T. Vanderbilt Co.), 4.89 parts by weight Novec® FC-4430 (available from 3M) and 0.86 parts by weight AKF-290 (available by Wacker). The total solids loading in solution would be 17.5 percent. A coating formulation would be deposited onto a substrate such as silicon, aluminum, glass, or another heat-resistant substrate. It is expected that the coating would be crosslinked and cured by stepwise heating in air at temperatures between 149° C. and 232° C. for between 4 to 12 hours.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A fuser member comprising a substrate, and thereover, an outer layer made by coating the substrate with a mixture comprising a fluorinated polymer comprising a flexible aliphatic segment and a rigid aromatic segment selected from the group consisting of

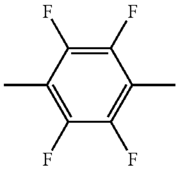,

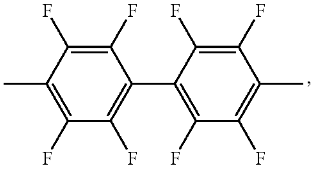,

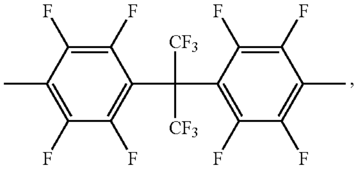,

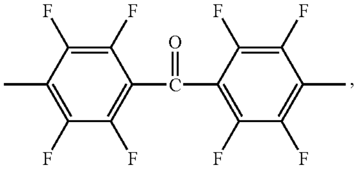,

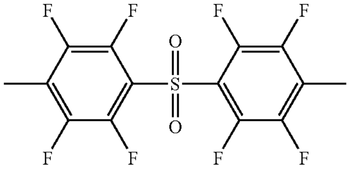,

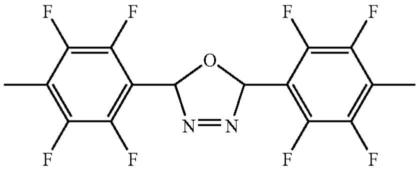,

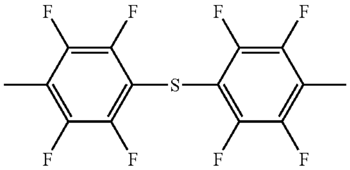,

-continued

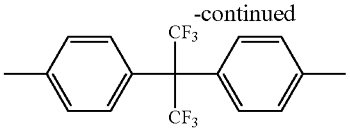, and mixtures thereof, and then crosslinking the fluorinated polymer with a curing agent, wherein the flexible aliphatic segment and the rigid aromatic segment are bonded through a linkage group selected from the group consisting of an ether, a thioether and an ester.

2. A fuser member in accordance with claim 1, wherein the flexible aliphatic segment comprises a monomeric repeat unit that is selected from the group consisting of vinylidene fluoride, tetrafluoroethylene, hexafluoropropylene, perfluoro(methyl vinyl ether), perfluoro(ethyl vinyl ether), perfluoro(propyl vinyl ether), and mixtures thereof.

3. A fuser member in accordance with claim 1, wherein the flexible aliphatic segment comprises a hydrocarbon component selected from the group consisting of a partially fluorinated hydrocarbon having from about 1 to about 500 carbons and a perfluorohydrocarbon having from about 1 to about 500 carbons.

4. A fuser member in accordance with claim 1, wherein the flexible aliphatic segment is selected from the group consisting of $-(C_nF_{2n})-$, $-CH_2(C_nF_{2n})CH_2-$, $-CH_2CH_2(C_nF_{2n})CH_2CH_2-$, and mixtures thereof, wherein $C_nF_{2n}$ is a linear or a branched perfluorocarbon chain, and n is a number of from about 1 to about 300.

5. The imaging member of claim 1, wherein the flexible aliphatic segment comprises $-(C_nF_{2n}O)_x-$, or a copolymer comprised thereof, wherein n is an integer of from 1 to about 6, and x is the number of repeating units ranging from about 1 to about 500.

6. The imaging member of claim 1, wherein the flexible aliphatic segment comprises a perfluoropolyether component selected from the group consisting of poly(difluoromethylene oxide), poly(tetrafluoroethylene oxide), poly(hexafluoropropylene oxide), poly(tetrafluoroethylene oxide-co-difluoromethylene oxide), poly(hexafluoropropylene oxide-co-difluoromethylene oxide), and poly(tetrafluoroethylene oxide-co-hexafluoropropylene oxide-co-difluoromethylene oxide).

7. A fuser member in accordance with claim 1, wherein the flexible aliphatic segment comprises a fluoroether component selected from the group consisting of $-(C_nF_{2n}O)_x-$, $-CH_2CF_2O(C_nF_{2n}O)_xCF_2CH_2-$, $-CH_2CH_2OCH_2CF_2O(C_nF_{2n}O)_xCF_2CH_2OCH_2CH_2-$, and mixtures thereof, wherein $C_nF_{2n}$ is a linear or branched perfluorocarbon chain, n is a number of from about 1 to about 6, and x is a number of from about 1 to about 500.

8. A fuser member in accordance with claim 1, wherein the flexible aliphatic segment comprises a fluoroether component that is a random or block copolymer selected from the group consisting of:

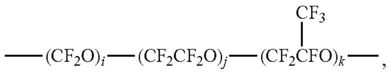,

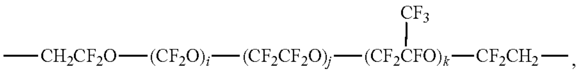,

-continued

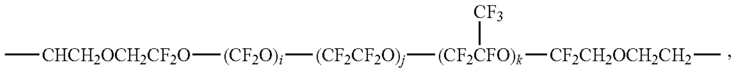

and mixtures thereof, wherein i, j, and k each represent an integer ranging from 0 to about 200, and wherein the total of i+j+k is ranging from about 3 to about 600.

9. A fuser member in accordance with claim 1, wherein the rigid aromatic segment comprises a linear or branched aromatic carbon chain that is partially or entirely fluorinated and has a carbon number of from about 6 to about 60.

10. The fuser member in accordance with claim 1, wherein said aliphatic-aromatic fluoropolymer comprises a polymer selected from the group consisting of the following

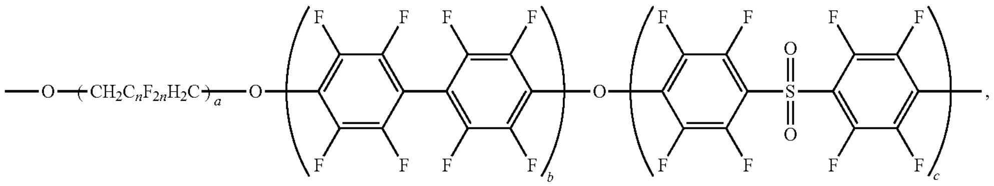

, and

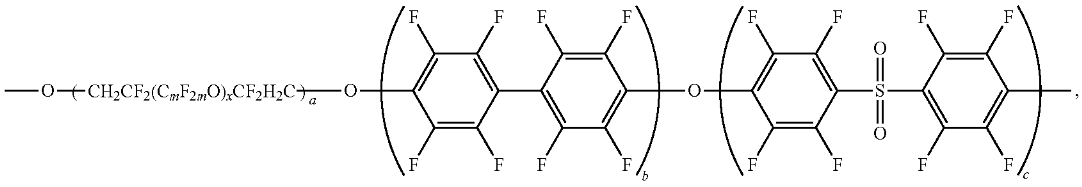

, wherein $C_nF_{2n}$ and $C_mF_{2m}$ are each a linear or branched perfluorocarbon chain, n is a number of from about 1 to about 100, m is a number of from about 1 to about 6, x is a number of from about 1 to about 500, and a, b, and c are molar ratios wherein a is a number of from about 0.25 to about 0.75, b is a number of from about 0.25 to about 0.75, c is a number of from about 0.01 to about 0.25, and a+b+c=1.

11. The fuser member of claim 1, wherein said fluoropolymer is crosslinked with a curing agent selected from the group consisting of a bisphenol, a diamine, a masked diamine, and an aminosilane.

12. The fuser member of claim 11, wherein said curing agent is selected from the group consisting of hexamethylenediamine, N,N'-dicinnamylidene-1,6-hexanediamine, [3-(trimethoxysilyl)propyl]-ethylenediamine, hydroquinone, substituted hydroquinones, 2,2-bis(4-hydroxyphenyl) hexafluoropropane, and 2,2-bis(4-hydroxyphenyl)propane.

13. The fuser member of claim 1, wherein said outer layer further comprises a carbon black or metal oxide filler.

14. A fuser member in accordance with claim 1, wherein said fluorinated polymer has the following Formula I:

$$-(A)_y L-(B)_z L- \quad \text{Formula I}$$

wherein A represents a flexible repeat monomer, B represents a rigid repeat monomer, and L represents a linker group between said flexible and rigid components, subscripts y and z refer to the ratios of the molecular segments along the polymer chains wherein y+z=1, and y is a number of 0 to 1 and z is a number of 0 to 1.

15. The fuser member in accordance with claim 14, wherein L of Formula I is selected from the group consisting of —O—, 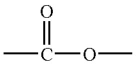, and —S—.

16. The fuser member in accordance with claim 14, wherein A of Formula I is a fluorocarbon or fluoroether chain selected from the group consisting of $-(C_nF_{2n})-$, $-CH_2(C_nF_{2n})CH_2-$, $CH_2CH_2(C_nF_{2n})CH_2CH_2-$, $-(C_mF_{2m}O)_x-$, $-CH_2CF_2O(C_mF_{2m}O)_xCF_2CH_2-$, $-CH_2CH_2OCH_2CF_2O(C_mF_{2m}O)_xCF_2CH_2OCH_2CH_2-$, and mixtures thereof, wherein $C_nF_{2n}$ and $C_mF_{2m}$ are each a linear or branched perfluorocarbon chain, n is a number of from about 1 to about 300, m is a number of from about 1 to about 6, and x is a number of from about 1 to about 500.

17. The fuser member in accordance with claim 14, wherein B of Formula I is selected from the group consisting of

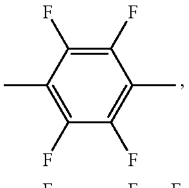

,

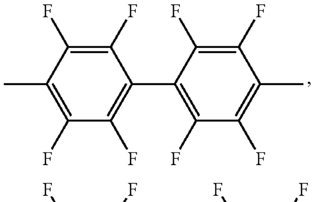

,

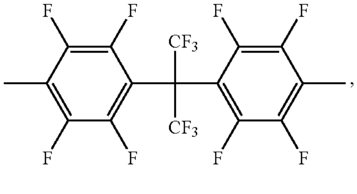

,

-continued

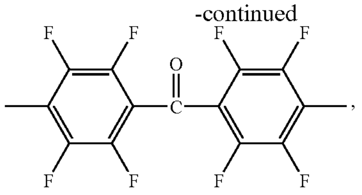

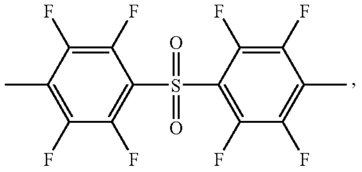

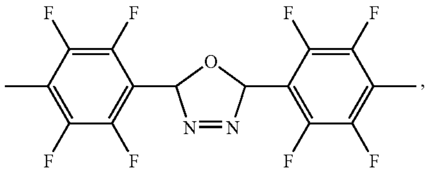

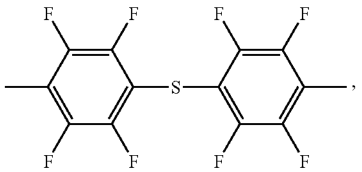

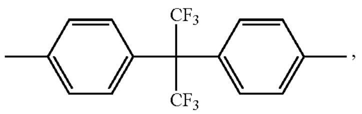

and mixtures thereof.

18. A fuser member comprising a substrate, and thereover, an outer layer comprising a fluorinated aromatic-aliphatic polyether comprising a polymer selected from the group consisting of the following

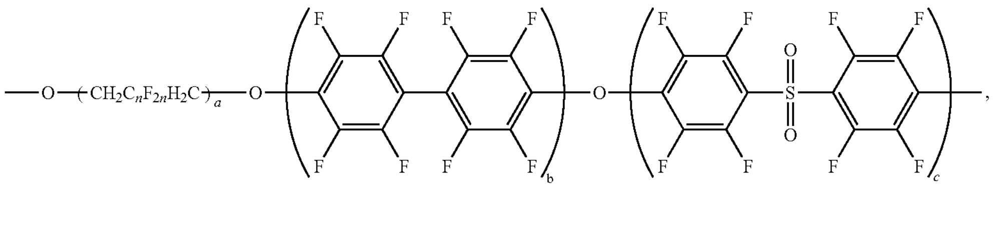

and

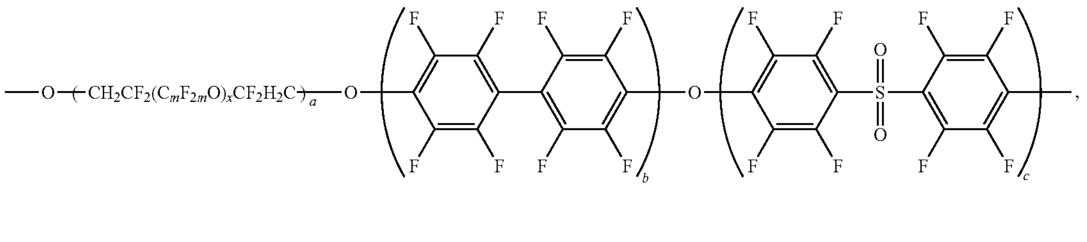

wherein $C_nF_{2n}$ and $C_mF_{2m}$ are each a linear or branched perfluorocarbon chain, n is a number of from about 1 to about 100, m is a number of from about 1 to about 6, x is a number of from about 1 to about 500, and a, b, and c are molar ratios wherein a is a number of from about 0.25 to about 0.75, b is a number of from about 0.25 to about 0.75, c is a number of from about 0.01 to about 0.25, and a+b+c=1; and wherein said outer layer is optionally cured with a curing agent.

19. An image forming apparatus for forming images on a recording medium comprising a charge-retentive surface to receive an electrostatic latent image thereon; a development component to apply toner to the charge-retentive surface to develop an electrostatic latent image to form a developed image on the charge-retentive surface; a transfer component to transfer the developed image from the charge retentive surface to a copy substrate; and a fuser member for fusing toner images to a surface of the copy substrate, wherein said fuser member comprises a substrate, and thereover, an outer layer made by coating the substrate with a mixture comprising a fluorinated aromatic-aliphatic polyether comprising a flexible aliphatic segment and a rigid aromatic segment selected from the group consisting of

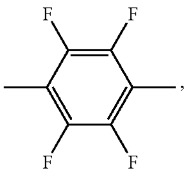

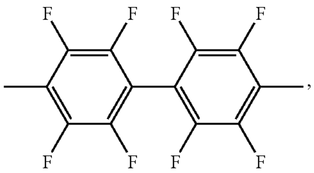

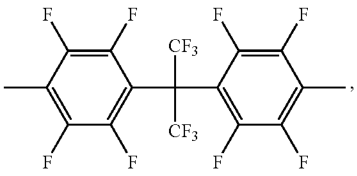

-continued
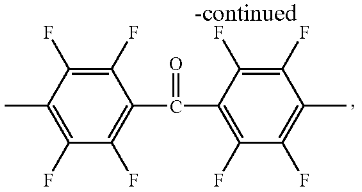
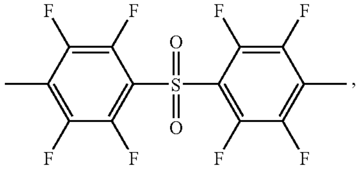
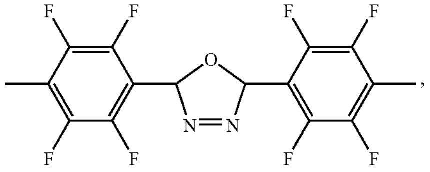
-continued
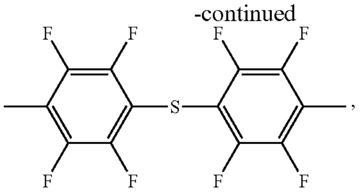
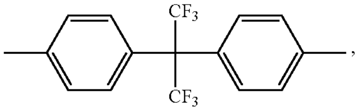
and mixtures thereof, and then crosslinking the fluorinated aromatic-aliphatic polyether, wherein the flexible aliphatic segment and the rigid aromatic segment are bonded through a linkage group selected from the group consisting of an ether, a thioether and an ester.
* * * * *